A. SHUSTER.
NUT LOCK.
APPLICATION FILED MAY 14, 1912.
1,064,553.
Patented June 10, 1913.
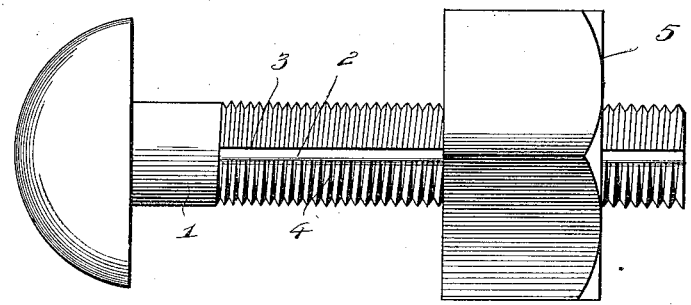
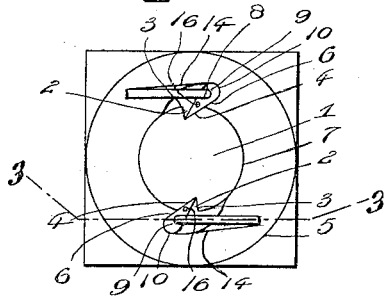
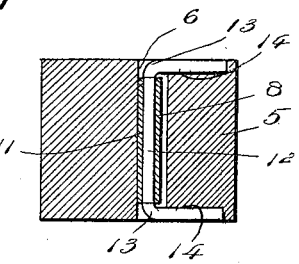
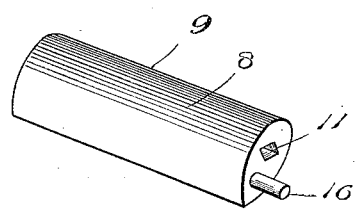
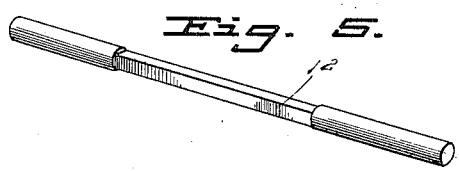
Inventor
Albert Shuster.
Witnesses
By Victor J. Evans
Attorney
COLUMBIA PLANOGRAPH CO., WASHINGTON, D. C.

UNITED STATES PATENT OFFICE.

ALBERT SHUSTER, OF SHAMOKIN, PENNSYLVANIA.

NUT-LOCK.

1,064,553.
Specification of Letters Patent.
Patented June 10, 1913.

Application filed May 14, 1912. Serial No. 697,253.

*To all whom it may concern:*

Be it known that I, ALBERT SHUSTER, a citizen of the United States, residing at Shamokin, in the county of Northumberland and State of Pennsylvania, have invented new and useful Improvements in Nut-Locks, of which the following is a specification.

This invention relates to nut locks and has for an object to provide a simple device of this character which when applied to the nut may be made to effectually engage the bolt so as to hold the former against retrograde movement thereon.

In the drawing forming a portion of this application, and in which like letters of reference indicate similar parts in the several views:—

Figure 1 is a side view of the nut lock. Fig. 2 is an end view thereof. Fig. 3 is a section on line 3—3 of Fig. 2. Fig. 4 is a perspective view of the rod. Fig. 5 is a perspective view of the dog.

In the use of the nut lock I employ a bolt 1 whose thread is interrupted by the formation in the shank of the bolt of longitudinal grooves 2 having radial surfaces or shoulders 3 and beveled surfaces 4. The nut 5 is provided with recesses 6 which open into the bolt opening 7 of the nut, the said grooves having mounted therein for rocking movements dogs 8. These dogs are identical in construction and each is provided with a curved outer edge 9 which is mounted to rock freely on the correspondingly curved wall 10 of the recess 6. A rod of steel is passed through the dog and secured therein, the dog being preferably provided with a rectangular bore 11 to receive the correspondingly formed intermediate portion 12 of the rod, whereby any accidental rotation of the dog on the stem of the rod is prevented. The opposite ends of the rod are bent at right angles as at 13 and seated in recesses 14 in the inner and outer surfaces of the nut. In this manner the dog is free to rock in the recess 6 with the supporting rod thereof acting as a spring to normally hold the locking end of the dog into the bolt opening of the nut. The beveled surfaces 4 of the grooves in the shank of the bolt serve to permit the dogs to be rocked against the tension of the spring rod as the nut is rotated in one direction. When the proper adjustment of the nut is obtained one or both of the dogs will be made to engage in corresponding grooves of the bolt and to impinge against the shoulders 3 so as to positively hold the nut against retrograde rotation. The dogs are provided with manipulating portions 16 that may be engaged by a suitable tool so as to force the dogs to released positions from the bolt.

I claim:—

1. In a nut lock a bolt having a longitudinal groove, a nut adjustable on the bolt and provided with a longitudinal recess therein which opens into the bolt opening of the nut, a dog mounted for rocking movements in the recess, a spring having an intermediate portion fixed to the dog and having end portions fixedly secured in the nut whereby the dog is held under tension and normally extended in the direction of the bolt opening in the nut, means for manipulating said dog.

2. In a nut lock a bolt having a longitudinal groove, a nut adjustably mounted on the bolt and provided with a recess, a dog mounted for rocking movements in the groove of the nut and provided with a rectangular passage, a spring secured to the nut and having a rectangular portion extending through the passage in the dog whereby the latter is normally held under tension to effect its automatic projection into the groove of the bolt on adjustment of the nut to one position, and means for manipulating said dog.

In testimony whereof I affix my signature in presence of two witnesses.

ALBERT SHUSTER.

Witnesses:
CURTIS BATTS,
HARVEY MORGAN.